United States Patent
Oroskar (10) Patent No.: US 8,908,605 B1
(45) Date of Patent: Dec. 9, 2014

(54) COORDINATION OF CODEC ASSIGNMENT AND RADIO CONFIGURATION IN WIRELESS COMMUNICATIONS

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 197 days.

(21) Appl. No.: 13/647,536

(22) Filed: Oct. 9, 2012

(51) Int. Cl.
*H04W 4/00* (2009.01)

(52) U.S. Cl.
USPC .......................................... 370/328

(58) Field of Classification Search
CPC ... H04L 1/1819; H04L 1/1887; H04L 5/0035; H04L 5/0055; H04L 5/0057; H04L 12/2869; H04L 12/5695; H04L 47/00; H04L 47/70; H04L 47/78; H04L 47/821; H04L 47/827; H04W 8/24; H04W 76/02; H04W 72/04
USPC ......... 370/203, 204–215, 229–240, 310–394, 370/395.1, 395.3, 395.4, 395.41, 395.42, 370/395.5, 395.52, 431–529, 523–520
See application file for complete search history.

(56) References Cited

U.S. PATENT DOCUMENTS

| | | | |
|---|---|---|---|
| 6,069,883 A | 5/2000 | Ejzak et al. | |
| 6,088,335 A | 7/2000 | I et al. | |
| 6,349,208 B1 | 2/2002 | Sexton et al. | |
| 6,584,098 B1 | 6/2003 | Dutnall | |
| 6,665,538 B1 | 12/2003 | Hunte | |
| 6,798,786 B1 | 9/2004 | Lo et al. | |
| 7,031,703 B1 | 4/2006 | Graf et al. | |
| 7,120,447 B1 | 10/2006 | Chheda et al. | |
| 7,200,171 B2 | 4/2007 | Forbes et al. | |
| 7,254,121 B2 | 8/2007 | Kim et al. | |
| 7,328,027 B1 | 2/2008 | Mangal | |
| 7,668,134 B2* | 2/2010 | Hosein et al. | 370/329 |
| 7,688,745 B1 | 3/2010 | Hurtta et al. | |
| 7,738,427 B1 | 6/2010 | Yew et al. | |
| 7,924,764 B2* | 4/2011 | Moorti et al. | 370/319 |
| 8,107,961 B1* | 1/2012 | Vargantwar et al. | 455/436 |
| 8,160,611 B1* | 4/2012 | Oroskar | 455/456.1 |
| 8,213,953 B1 | 7/2012 | Mangal | |
| 8,254,930 B1 | 8/2012 | Mauer et al. | |
| 8,442,012 B1* | 5/2013 | Singh et al. | 370/335 |
| 8,457,069 B1* | 6/2013 | Vargantwar et al. | 370/331 |

(Continued)

OTHER PUBLICATIONS

Unpublished U.S. Appl. No. 13/595,668, entitled "Managing Codec Consistency Across a Communication Session" filed Aug. 27, 2012 in the name of Sachin R. Vargantwar.

(Continued)

*Primary Examiner* — Jung-Jen Liu (57) ABSTRACT

A method and system is disclosed for coordinating codec assignment and radio configuration in wireless communication sessions. When a communication session is set up for an access terminal (AT) operating in a wireless communication system, a network device, such a base station, can determine a coding rate to assign the AT for its air interface in a manner that accounts for radio configuration in a wireless coverage zone of the base station. The base station could use a distribution of types of cover codes in use to monitor radio configuration, and then assign a codec and coding rate for new calls based on the distribution.

17 Claims, 5 Drawing Sheets

(56) References Cited

U.S. PATENT DOCUMENTS

| | | | |
|---|---|---|---|
| 8,457,633 B1 * | 6/2013 | Oroskar | 455/435.2 |
| 8,483,699 B1 * | 7/2013 | Oroskar | 455/450 |
| 8,565,759 B1 * | 10/2013 | Oroskar | 455/432.1 |
| 8,644,178 B1 | 2/2014 | Oroskar | |
| 8,750,231 B1 * | 6/2014 | Oroskar et al. | 370/329 |
| 2003/0007466 A1 | 1/2003 | Chen | |
| 2003/0031200 A1 | 2/2003 | Lehtimaki | |
| 2003/0236909 A1 | 12/2003 | Chu | |
| 2004/0037312 A1 * | 2/2004 | Spear | 370/465 |
| 2006/0182068 A1 | 8/2006 | Stopler | |
| 2006/0280159 A1 * | 12/2006 | Bi et al. | 370/342 |
| 2007/0058623 A1 * | 3/2007 | Moorti et al. | 370/389 |
| 2009/0209300 A1 | 8/2009 | Furbeck | |
| 2012/0020248 A1 | 1/2012 | Granlund et al. | |
| 2012/0028642 A1 | 2/2012 | Schliwa-Bertling | |
| 2012/0224561 A1 * | 9/2012 | Fang et al. | 370/331 |
| 2012/0307921 A1 * | 12/2012 | Ulmer-Moll et al. | 375/259 |

OTHER PUBLICATIONS

Unpublished U.S. Appl. No. 13/595,632, entitled "Maintaining Codec Consistency Across a Communication Session" filed Aug. 27, 2012 in the name of Sachin R. Vargantwar.

Unpublished U.S. Appl. No. 13/626,497, entitled "Managing Codec Consistency Across a Communication Session" filed Sep. 25, 2012 in the name of Siddharth S. Oroskar.

Office Action in U.S. Appl. No. 13/595,668 mailed May 19, 2014.

Unpublished U.S. Appl. No. 13/852,349, entitled "Coordination of Codec Consistency Across Wireless Coverage Areas" filed Mar. 28, 2013 in the name of Siddharth S. Oroskar.

Unpublished U.S. Appl. No. 13/860,579, entitled Coordination of Codec Consistency Based on Cross-Carrier Assignment filed Apr. 11, 2013 in the name of Siddharth S. Oroskar.

* cited by examiner

Table 400:

| $r = \dfrac{RC3}{RC4}$ | $L_1$ | $L_2$ |
|---|---|---|
| $2 < r$ | 0.6 | 0.9 |
| $1 < r \leq 2$ | 0.4 | 0.8 |
| $r \leq 1$ | 0.2 | 0.6 |

Table 402:

| $L$ = Capacity Loading | COP |
|---|---|
| $L \leq L_1$ | 2 |
| $L_1 < 0.6 \leq L_2$ | 4 |
| $L_2 < L$ | 6 |

$r = \dfrac{RC3}{RC4}$

404 — $2 < r$:

| $L \leq 0.6$ COP2 | $L < 0.6 \leq 0.9$ COP4 | $0.9 < L$ COP6 |
|---|---|---|

406 — $1 < r \leq 2$:

| $L \leq 0.4$ COP2 | $L < 0.4 \leq 0.8$ COP4 | $0.8 < L$ COP6 |
|---|---|---|

408 — $r \leq 1$:

| $L \leq 0.2$ COP2 | $L < 0.2 \leq 0.6$ COP4 | $0.6 < L$ COP6 |
|---|---|---|

FIG. 5

COORDINATION OF CODEC ASSIGNMENT AND RADIO CONFIGURATION IN WIRELESS COMMUNICATIONS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). Under IS-2000, packet-data communications may be referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." Access terminals may be capable of communication with either or both protocols, and may further be capable of handing off between them, in addition to being able to hand off between various configurations of coverage areas.

OVERVIEW

Under IS-2000 (and other versions of CDMA) and IS-856, communications from the wireless communication system (or the "wireless network") to an access terminal are carried on a "forward link" of the air interface, and communications from an access terminal to a base station are carried on a "reverse link" of the air interface. For IS-2000, data sent on both the forward and reverse links are assembled into units called frames, which contain data encoded for transmission to or from the access terminal (and correspondingly, from or to the base station), and are transmitted at regular intervals (corresponding to a reciprocal frame rate), typically 20 milliseconds in duration (although other transmission intervals can be used). The frame interval is also referred to as the frame size. The receiving entity (e.g., access terminal on the forward link, and the wireless network—or a network device therein—on the reverse link) decodes the encoded data in received frames to recover the original data.

Encoding data for assembly in frames typically involves compression of data from an input bit rate to an output bit rate, where the output bit rate usually requires reduced transmission bandwidth (or data storage space) compared with the input bit rate. The amount of compression achieved depends on the compression scheme or algorithm applied, including whether or not any information in the input data is lost or modified in the process (e.g., rendered in some form of analytic approximation in order to accommodate reduced "volume"). The decoding process essentially reverses the encoding process, including decompressing the compressed data. The fidelity of the recovered data to the original data depends, in part, on how well the compression-decompression scheme compensates for lost or modified information, as well as the ability of the scheme to correct for degradation due to imperfect transmission (e.g., errors, noise, etc.). For a given frame size (e.g., 20 milliseconds) and corresponding frame rate (reciprocal of the frame size), the amount of data encoded into a frame thus corresponds to a data coding rate (also referred to herein as a "coding rate" and/or just a "data rate").

The implementation of an encoding-decoding algorithm is referred to as a "codec" (for coder/decoder), and usually takes the form of a device (e.g., a digital signal processor, or the like) and/or computer-executable instructions (e.g., software, firmware, etc.). Different codecs may implement different encoding-decoding schemes, including the ability to achieve different levels of compression (yielding a coding rate) and/or different degrees of protection against transmission errors, and a given codec may have different modes of operation that similarly accommodate different levels of compression (yielding a coding rate) and/or different degrees of protection against transmission errors. Codecs typically comply with one or another industry standard in order to help insure interoperability.

For example, CDMA 2000 Spread Spectrum Systems (also referred to as CDMA2000 1X) and CDMA 2000 Spread Spectrum Systems Revision E (also referred to as CDMA2000 1X Advanced) specify support for a family of codecs referred to under the umbrella of "Enhanced Variable Bitrate Codec," or "EVRC." More particularly, "EVRC-B" (and upgrade to EVRC) is a speech codec that defines eight levels of average data rates that may be selected for encoding on a forward link to, and/or a reverse link from, an access terminal engaging in a voice call. Generally, a higher the data rate requires higher transmission power, but provides the better the voice quality, and vice versa. The eight levels are referred to as "capacity operating points" or "COPs," and are labeled with parameter values 0 through 7, in order from highest to lowest average data rate. When a given call is set up, the RAN (or RAN element, such as a BSC) selects a COP value based on capacity utilization of the sector in which the access terminal is operating. The COP value may also be adjusted by the RAN as the access terminal moves between sectors that have differing capacity loading conditions.

In addition to encoding data for assembly in frames, communications on different air-interface links may also be encoded with different "cover codes" that render the transmitted signals uniquely identifiable within a cell or sector (or other type of wireless coverage zone), even when the transmissions on the different air-interface links are concurrent. For example, under IS-2000, each respective access terminal with an active communication session in a given sector is assigned a different "Walsh" code, and communications on each respective air-interface forward link are "cover-encoded" with the Walsh code assigned to the respective access terminal. Walsh codes can be defined as binary number strings of specified bit length.

The bit length determines the number of different Walsh codes that can be defined for encoding uniquely identifiable forward links. The longer the bit length, the larger the number, and vice versa. Hence, the bit length of a Walsh code (or other type of cover code) also determines how many communication sessions can be concurrently transmitted. A longer Walsh code length supports a larger number of concurrent communication sessions, and vice versa. Accordingly, use of longer Walsh codes may place higher demands on a transmission power budget, and also result in more interference.

In some wireless communication systems, one or more cells or sectors may support concurrent use of cover codes with different bit lengths. For example, a sector may assign 64-bit Walsh codes to some access terminals, and 128-bit Walsh codes to others. When a new Walsh code is assigned by a base station or BTS (or other RAN device), for example in response to a request for a new communication session, the type of Walsh code (i.e., bit length) may be determined based on a current distribution of Walsh code types already assigned. Since the transmission power utilization in a cell or sector depends, at least in part, how many forward links are transmitted concurrently, which in turn depends on the Walsh code bit length, accounting for the distribution of assigned Walsh code types can provide a way to help manage transmission power and resultant interference.

As noted above, the COP value used for a given voice call is also related to transmission power. However, in conventional operation, the coding rate (as determined by COP value) is selected without consideration of the distribution of Walsh code types (or more generally, of cover code types). As a result, higher encoding rates (lower COP values) requiring higher transmission power may be selected when transmission power utilization due to the Walsh code distribution is already high. Conversely, lower encoding rates (higher COP values) requiring lower transmission power may be selected when transmission power utilization due to the Walsh code distribution is low enough to support higher encoding rates.

The above example illustrates how conventional assignment of COP values can result in inefficient use of transmission capacity on forward and/or reverse links with access terminals in a wireless communication system. While the particular example is directed to voice calls, the principles apply more generally to communication sessions for carrying voice and/or other forms of data. Accordingly, it would be desirable to be able to account for a distribution of cover code types in a wireless coverage zone when selecting data coding rates for new communication sessions. By doing so, allocation of transmission capacity on forward and/or reverse links can be more efficiently managed.

Hence in one respect, various embodiments of the present invention provide, in a radio access network (RAN) device of a wireless communication system that includes a base station, a method comprising: transmitting respective wireless signals on a respective air-interface forward link from a base station of the RAN device to each of a given number of access terminals operating in a wireless coverage zone of the base station, wherein communications on each respective air-interface forward link are encoded with a respective cover code that is one of a plurality of types of cover codes, each of the plurality of types of cover codes having a different cover-code bit length; in response to receiving a request to set up a new communication session with a particular access terminal, allocating a new cover code for encoding communications on a new air-interface forward link in the wireless coverage zone from the base station to the particular access terminal, wherein the allocated new cover code is of a type selected from the plurality, based on a distribution among the given number of access terminals of the types of cover codes; updating the distribution based on allocating the new cover code; and determining a coding rate for communications on the new air-interface forward link based on both the updated distribution and capacity loading in the wireless coverage zone when the request was received.

In another respect, various embodiments of the present invention provide, a radio access network (RAN) device of a wireless communication system comprising: one or more processors; memory accessible by the one or more processors; and computer-readable instructions stored in the memory that upon execution by the one or more processors cause the RAN device to carry out functions including: transmitting respective wireless signals on a respective air-interface forward link from a base station of the RAN device to each of a given number of access terminals operating in a wireless coverage zone of the base station, wherein communications on each respective air-interface forward link are encoded with a respective cover code that is one of a plurality of types of cover codes, each of the plurality of types of cover codes having a different cover-code bit length, in response to receiving a request to set up a new communication session with a particular access terminal, allocating a new cover code for encoding communications on a new air-interface forward link in the wireless coverage zone from the base station to the particular access terminal, wherein the allocated new cover code is of a type selected from the plurality, based on a distribution among the given number of access terminals of the types of cover codes, updating the distribution based on allocating the new cover code, and determining a coding rate for communications on the new air-interface forward link based on both the updated distribution and capacity loading in the wireless coverage zone when the request was received.

In yet another respect, various embodiments of the present invention provide, a non-transient computer-readable medium having instructions stored thereon that, upon execution by one or more processors of a radio access network (RAN) device of a wireless communication network, cause the RAN device to carry out functions including: transmitting respective wireless signals on a respective air-interface forward link from a base station of the RAN device to each of a given number of access terminals operating in a wireless coverage zone of the base station, wherein communications on each respective air-interface forward link are encoded with a respective cover code that is one of a plurality of types of cover codes, each of the plurality of types of cover codes having a different cover-code bit length; in response to receiving a request to set up a new communication session with a particular access terminal, allocating a new cover code for encoding communications on a new air-interface forward link in the wireless coverage zone from the base station to the particular access terminal, wherein the allocated new cover code is of a type selected from the plurality, based on a distribution among the given number of access terminals of the types of cover codes; updating the distribution based on allocating the new cover code; and determining a coding rate for communications on the new air-interface forward link based on both the updated distribution and capacity loading in the wireless coverage zone when the request was received.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Example embodiments will be described by way of example with reference to Code Division Multiple Access ("CDMA") communications in general, and to IS-856 and IS-2000 (including CDMA2000 1X and CDMA2000 1X Advanced) communications in particular. As described below, IS-2000 applies to both circuit-cellular and packet-data communications, and is referred to herein as "conventional" CDMA communications. For voice communications, CDMA2000 1X and/or CDMA2000 1X Advanced may specify codec support according to EVRC, including EVRC-B, EVRC-WB, and EVRC-NW. IS-856 applies more exclusively to packet-data communications (including, e.g., real-time voice and data applications), and is referred to herein as "high rate" packet-data communications. It should be understood that example embodiments can apply to other wireless voice and data protocols including, without limitation, IS-95 and GSM, which, together with IS-856 and IS-2000 are considered herein, individually or in combination, to comprise a CDMA family of protocols.

Figure 1:
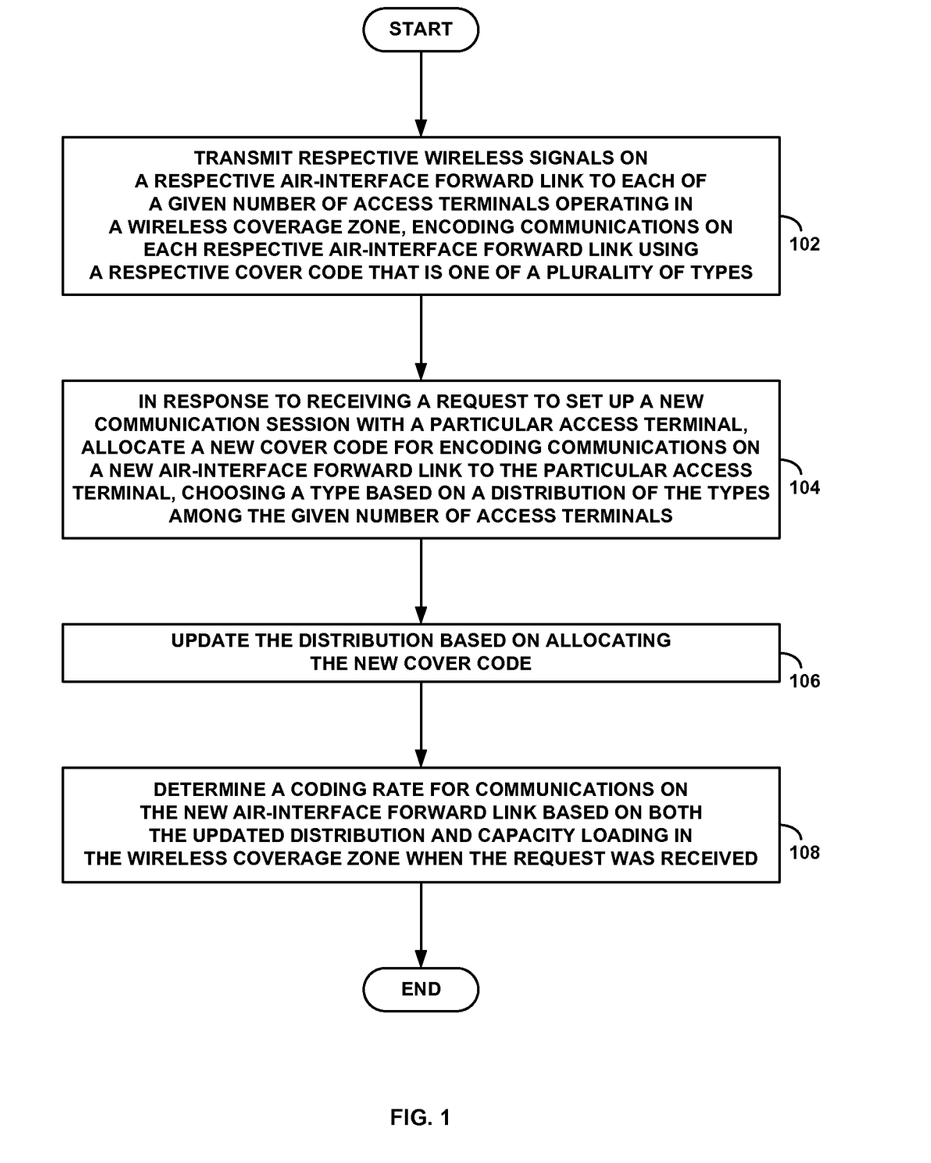
FIG. 1 is a flowchart illustrating an example method of coordinating codec assignment and radio configuration in wireless communication sessions, in accordance with an example embodiment.

FIG. 1 is a flowchart illustrating an example method of coordinating codec assignment and radio configuration in wireless communication sessions, in accordance with example embodiments. By way of example, the method could be carried out by a RAN device configured to operate according to a CDMA family of protocols, including at least CDMA2000 1X. The RAN device could be, for example, BTS, a base station, a BSC, or an MSC operating in a wireless communication system (or wireless communication network) that is also configured to operate according to a CDMA family of protocols.

At step 102, the RAN device transmits respective wireless signals on a respective air-interface forward link in a wireless coverage zone to each of a given number of access terminals operating in the wireless coverage zone. Communications on each respective air-interface forward link could be encoded with a respective cover code that is one of a plurality of types of cover codes, and each of the plurality of types of cover codes could have a different cover-code bit length.

At step 104, the RAN device responds to receiving a request to set up a new communication session with a particular access terminal by allocating a new cover code for encoding communications on a new air-interface forward link in the wireless coverage zone from the RAN device (e.g., a base station) to the particular access terminal. In allocating the new cover code, the RAN device may select a type of cover code from the plurality based on a distribution among the given number of access terminals of the types of cover codes. The manner in which this might be achieved is described below in more detail.

At step 106, the RAN device updates the distribution based on allocating the new cover code. More specifically, selection of the cover code type for the allocated new cover code adds one more cover code of the selected type to the distribution. Updating the distribution thus accounts for this change.

Finally, at step 108, the RAN device determines a coding rate for communications on the new air-interface forward link based on both the updated distribution and capacity loading in the wireless coverage zone when the request was received. By doing so, the RAN device may account for transmission power utilization in the wireless coverage zone, as reflected in the distribution of cover code types currently allocated.

In accordance with example embodiments, determining the coding rate for communications on the new air-interface forward link based on both the updated distribution and the capacity loading in the wireless coverage zone could include adjusting one or more capacity loading thresholds based on the updated distribution, and then comparing the capacity loading in the wireless coverage zone with at least one of the one or more adjusted capacity loading thresholds.

More specifically, the plurality of types of cover codes could include two different types—a first type and a second type—each having a different one of two different cover-code bit lengths. In this case, the distribution among the given number of access terminals of the types of cover codes could correspond to a first number that tallies how many of the given number of access terminals have been assigned a cover code of the first type, and a second number that tallies how many have been assigned a cover code of the second type. Updating the distribution could then correspond to incrementing by one the first or second number based on whether the allocated new cover code is of the first or second type, respectively. With this arrangement, determining the coding rate for communications on the new air-interface forward link based on both the updated distribution and the capacity loading in the wireless coverage zone could be accomplished by adjusting one or more capacity loading thresholds based on a ratio of the first number to the second number (after first updating the distribution), and then comparing the capacity loading in the wireless coverage zone with at least one of the one or more adjusted capacity loading thresholds.

In accordance with example embodiments in which the wireless communication system is configured to operate according to CDMA2000 1X and/or CDMA2000 1X Advanced with codec support according to EVRC, including at least EVRC-B, the RAN device could be a base station, and the wireless coverage zone could be a cell or a sector. In such a system, each respective cover code could be a Walsh code, and the plurality of types could be one of two types: a first type defined according to Radio Configuration 3 (RC3) and a second type defined according to Radio Configuration 4 (RC4). As is known, the RC3 bit length is specified as 64 bits and the RC4 bit length is specified as 128 bits.

By way of example, the new communication session could be a voice call that is requested by the particular access terminal. In this case, the selected type of the allocated new cover code could be one or the other of an RC3 Walsh code and an RC4 Walsh code, and the distribution could correspond to a first number of RC3 voice calls and a second number of RC4 voice calls. After updating the distribution, the sum of the first number and the second number would be the given number of access terminals with active communications session when the request for a new voice call was received, plus one more for the new voice call.

Under EVRC-B, coding rates may be assigned according to predefined Capacity Operating Point (COP) parameter values. More particularly, COP parameter values may be defined in a range from a minimum COPs value to a maximum COPs value, where each COP parameter value is associated with a different coding rate. Larger COP parameter values are associated with smaller coding rates, and vice versa. For example, eight integer COP parameter values ranging from 0, . . . , 7 may be defined to specify coding rates that yield average data rates ranging from 6.93 kilobits per second (kbps) down to 3.75 kbps. Thus, in the case of a new voice call, determining the coding rate could correspond with selecting a voice codec and an encoding rate for the new voice call according to one of the predefined COP values.

In further accordance with example embodiments, determining the coding rate for communications on the new air-interface forward link based on both the updated distribution and the capacity loading in the wireless coverage zone could include adjusting one or more threshold boundaries separating two or more contiguous ranges of capacity loading values based on a ratio of the first number or RC3 voice calls in the cell or sector to the second number of RC4 voice calls in the cell or sector. The current capacity loading for the cell or sector could then be mapped to a particular one of the two or more ranges, and a COP value could be selected depending on the particular range. Mapping could simply be an arithmetic determination of which of the three ranges the current capacity loading falls into. By adjusting the range boundaries according to the ratio of the number of RC3 calls to the number RC4 calls, selection of the codec and coding rate for the new voice call can be made to depend, at least in part, on radio configuration conditions in the sector.

By way of example, the RAN device could maintain (e.g., in one or another form of memory) a table of parameters that specify three contiguous ranges of fractional capacity loading defined in terms of utilization from zero to one. In this case, there could be two adjustable threshold boundaries separating the three ranges. The ranges could thus be dynamically adjusted by adjusting the two threshold boundaries according to the ratio of the number of RC3 calls to the number RC4 calls. The number of different configurations of fractional capacity loading ranges, each configuration including three contiguous ranges of fractional capacity loading, could be determined by how the RC3/RC4 number ratio is evaluated. As an example, the number ratio could itself be compared with three ranges of ratio values; this would yield three configurations of fractional capacity loading ranges. Then mapping the current capacity loading in the wireless sector to the particular range could include determining the current capacity as a fraction of a maximum available capacity (i.e., a utilization factor), and mapping the determined fraction to one of the three contiguous ranges of fractional capacity loading values.

Using a different number of ranges of ratio values could give a different number of configuration choices. Alternatively, the two values of the threshold boundaries separating the three contiguous ranges of fractional capacity loading could be determined as a function of the RC3/RC4 number ratio. Such a function could be more or less complex than mapping the RC3/RC4 number ratio to one of a plurality of predetermined number-ratio ranges.

In accordance with example embodiments, capacity loading in the wireless sector could be determined according to a number of different loading conditions. These could include forward-link transmission power utilization, backhaul utilization, number of active call sessions, reverse noise threshold, and reverse signal strength indication. Other forms of loading condition could be used as well.

It will be appreciated that the steps of FIG. 1 are presented by way of example, and that additional and/or alternative steps or alternative ordering of steps could be carried out and still remain within the scope and spirit of the embodiments herein.

Figure 2:
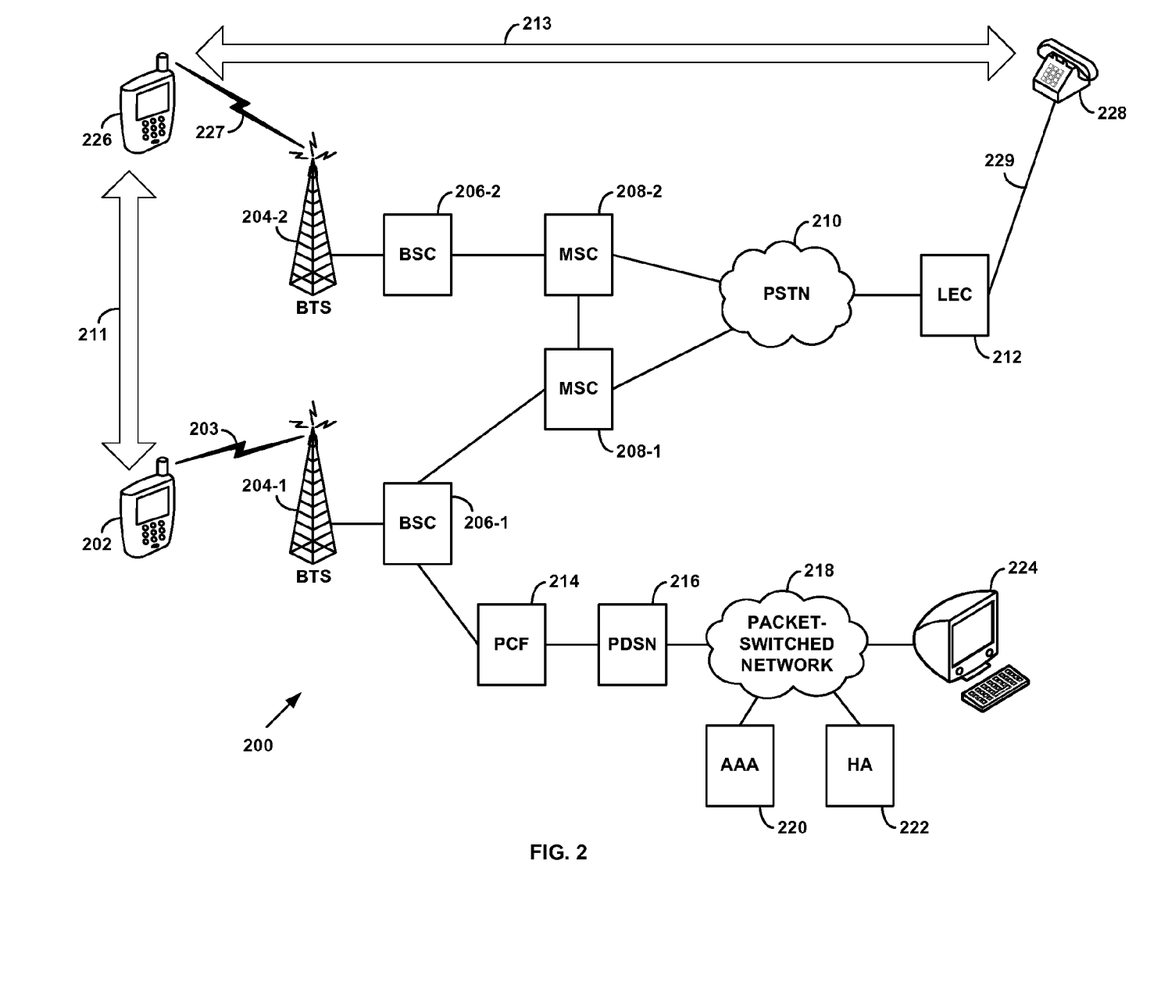
FIG. 2 is a simplified block diagram of a wireless communication system in which example embodiments of coordinating codec assignment and radio configuration in wireless communication sessions can be employed.

FIG. 2 shows a simplified block diagram of a wireless communication system 200 in which example embodiments of coordinating codec assignment and radio configuration in wireless communication sessions could be employed. Access terminal AT 202 communicates over an air interface 203 with a BTS 204-1, which is then coupled or integrated with a BSC 206-1. Transmissions over air interface 203 from BTS 204-1 to AT 202 represent the forward link to the access terminal (also referred to herein alternatively as the forward link from the base station, and as "the AT's forward link"). Transmissions over interface 203 from AT 202 to BTS 204-1 represent the "reverse link" (also referred to herein as "the AT's reverse link"). It will be appreciated that the arrangement shown in the figure is illustrative.

For purposes of illustration, a second access terminal 226 is shown communicating over an air interface 227 with a BTS 204-2, which is then coupled or integrated with a BSC 206-2.

Transmissions over air interface 227 from BTS 204-4 to AT 226 represent the forward link to the access terminal, while transmissions over interface 227 from AT 226 to BTS 204-2 represent the reverse link.

The BSC 206-1 is connected to MSC 208-1, which acts to control assignment of air traffic channels (e.g., over air interface 203), and provides access to wireless circuit-switched services such as circuit-voice and circuit-data (e.g., modem-based packet data) service. By way of example, the MSC 208-1 is shown as being connected to a second MSC region represented in the figure by the MSC 208-2, the BSC 206-2, and the BTS 204-2. Support for user mobility across MSC regions, as well as communications between AT in different MSC regions, is represented by the connection shown between the MSC 208-1 and 208-2.

As represented by their respective connections to PSTN 210, MSCs 208-1 and 208-2 are also coupled with one or more telephony circuit switches, such as the Local Exchange Carrier (LEC) switch 212 in the operator's (or in a different operator's) network. The LEC 212 (or other form of landline switch) may support connectivity to landline subscribers, such as is represented by landline phone 228 connected via the end link 229.

An example communication session between access terminals served by different base stations (and MSCs) is represented by a communication session 211 between AT 202 and AT 226. Similarly, an example communication session between an access terminal and a landline phone is represented by a communication session 213 between AT 226 and landline telephone 328. Note that the illustration is not necessarily intended to indicate that both communicative sessions 211 and 213 are concurrent.

As shown, BSC 206-1 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224. Although not necessarily shown explicitly in FIG. 2, the BSC 208-2 may also provide a packet data connection to a packet switch network, such the network 218, for packet-data services.

It should be understood that the depiction of just one (or two) of each network element in FIG. 2 is illustrative, and there could be more than one (or two) of any of them, as well as other types of elements not shown. The particular arrangement shown in FIG. 2 should not be viewed as limiting with respect to the embodiments herein. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a transceiver, a communication interface, a tone detector, a processing unit, and data storage, all of which may be coupled together by a system bus or other mechanism. As such, system 200, ATs 202 and 226, air interfaces 203 and 227, landline phone 228, and end link 229 are representative of exemplary means of implementing and carrying out the various functions, steps, and procedures described herein.

Figure 3:
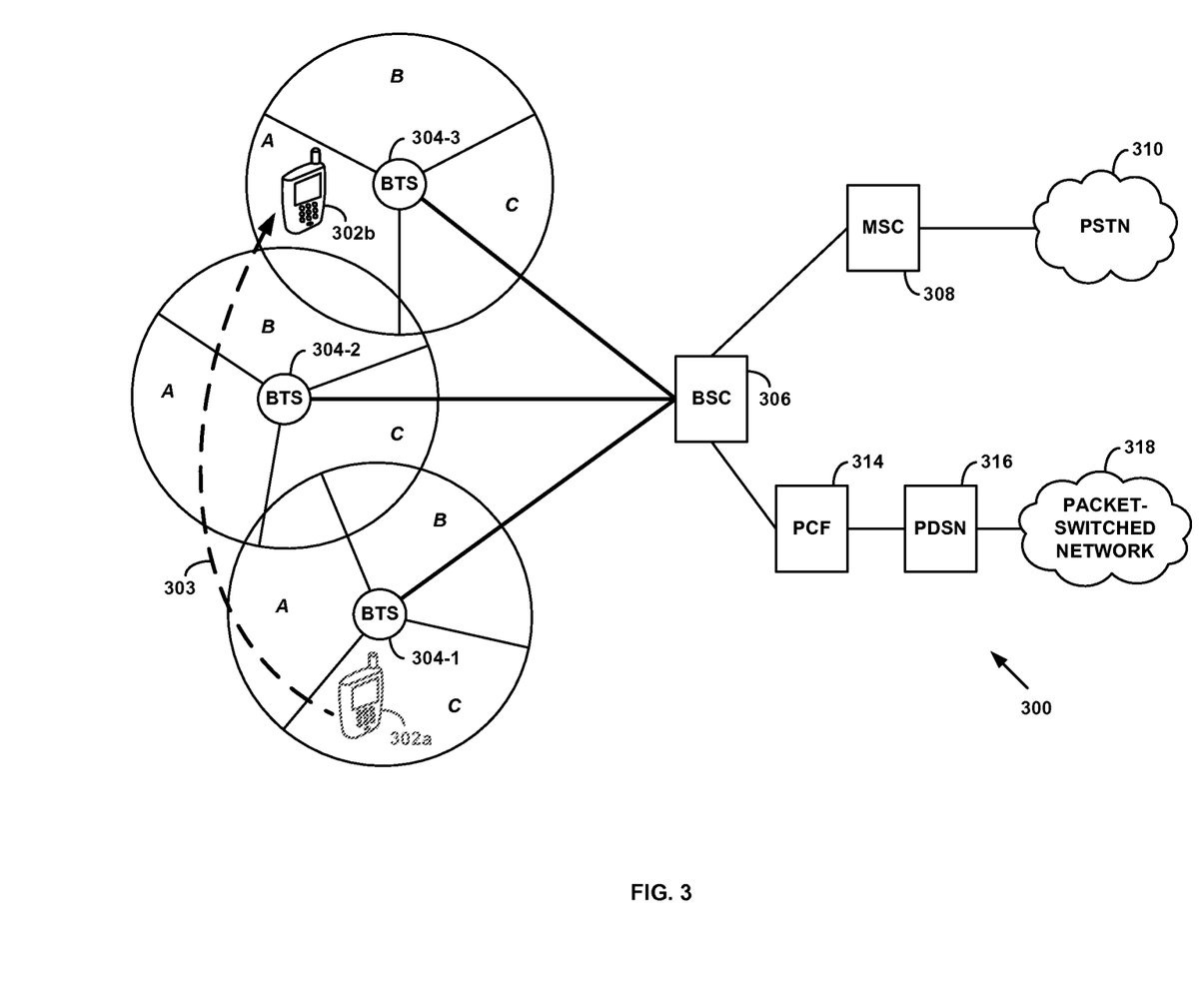
FIG. 3 is another version of a simplified block diagram of a wireless communication system in which example embodiments of coordinating codec assignment and radio configuration in wireless communication sessions can be employed.

In practice, a BSC, such as the BSCs 206-1 and 206-2 may serve multiple BTSs, each of which may then radiate to define a given cell and a plurality of cell sectors. This arrangement is illustrated in FIG. 3, which shows BSC 306 in network 300 coupled with three BTSs 304-1, 304-2, and 304-3. Each BTS is shown at the core of a respective circle representing a cell, and each cell is divided into three pie-pieces, labeled "A," "B," and "C," representing wireless service sectors. With this arrangement, an access terminal can operate in any of the sectors and can connect, via a serving BTS, with a MSC 308 for circuit-based services in the wireless communication system and beyond (e.g., in PSTN 310). Through its serving sector, an access terminal can also communicate, via PCF 314 and PDSN 316, on packet network 318. Note that the depiction of three wireless services sectors for each of the BTSs in FIG. 3 is by way of example, and other numbers of sectors per BTS are possible. Further, the relative positions of the BTSs and the relative angular orientations of the wireless service sectors are also illustrative, and other arrangements may be used.

FIG. 3 also illustrates how an access terminal may handoff to multiple sectors during the course of a communication session. In the example, an access terminal moves along a path 303 from sector "C" of the BTS 304-1 to sector "A" of the BTS 304-3. The starting position marked with an access terminal 302a; the ending position is marked with the same access terminal, but labeled 302b. In the illustrated example, the path 303 crosses sector "A" of BTS 304-1, sector "A" of BTS 304-2, and sector "B" of BTS 304-2, in addition to the starting and ending positions. The access terminal 302 could handoff to each sector it traverses in moving along the path 303.

Throughout this description, the term "base station" will be used to refer to a Radio Access Network (RAN) element or RAN device such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by Walsh codes. Each Walsh code is can be represented as a bit string of a specified bit length. When an access terminal operates in a given sector, communications between the access terminal and the BTS of the sector are carried on a given frequency and are encoded by the sector's PN offset and a given Walsh code.

Encoding communications on each channel within a sector with a different Walsh code renders the transmitted signals distinguishable from signals encoded with other Walsh codes and transmitted concurrently on other channels. In order to achieve this, the different Walsh codes are computationally constructed according to known techniques to be mutually orthogonal. For a set of Walsh codes each of the same given bit length, the number of orthogonal code possible depends on the given bit length. For example, for a bit length of 64 bits, it is possible to construct 64 orthogonal Walsh codes; for a bit length of 128 bits, it is possible to construct 128 orthogonal Walsh codes. The number of orthogonal Walsh codes also determines how many channels of a given carrier frequency can support concurrent transmission within a sector. Walsh codes are unique within a sector, but not necessarily across sectors.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

With arrangement described above, an access terminal can engage in cellular voice or packet-data communications. Referring again to FIG. 2, and taking an originating call from AT 202 as an example, AT 202 first sends an origination request over air interface 203 and via the BTS 204-1 and BSC 206-1 to MSC 208-1. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal).

For a packet-data session, the BSC 206-1 signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based. Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000.

TDM access on the IS-856 forward link is achieved by dividing the forward link in the time domain into time slots of length 2048 chips each. At a chip rate of 1.228 Mega-chips per second, each slot has a duration of 1.67 milliseconds (ms).

Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise IS-856 control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Operation in an IS-856 compliant communication system may be illustrated, again with reference to FIG. 2. To acquire packet data connectivity under IS-856, after an access terminal first detects an IS-856 carrier, the access terminal 202 sends to its BSC (or RNC) 206-1a UATI (Universal Access Terminal Identifier) request, and receives in response an UATI, which the access terminal can then use to identify itself in subsequent communications with the BSC. The access terminal then sends a connection-request to the BSC 206-1, and the BSC responsively invokes a process to authenticate the access terminal and to have the access terminal acquire a data link.

In particular, the BSC 206-1 sends an access request to an Access Network AAA (ANAAA) server (which may be different than the AAA server 220), and the ANAAA server authenticates the access terminal. The BSC 206-1 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC 206-1 signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. Coordinating Radio Configuration and Codec Assignment in Session Setup a. Radio Configuration When a communication session, such as a voice call, is set up with an access terminal operating in a wireless communication system, a forward link from the base station to the access terminal, and a reverse link from the access terminal to the base station, is established on an air interface between the access terminal and the base station. In a system in which communications on different channels within a cell or sector (or other type of wireless coverage zone) are transmitted concurrently, a new cover code needs to be assigned to the access terminal for the new forward link. For example, under IS-2000, a new Walsh code would need to be assigned. As described above, the new Walsh code may be selected by the base station (or BTS, for example) from a set of mutually orthogonal Walsh codes.

The number of mutually orthogonal Walsh codes in a set depends on the bit length of the Walsh codes in the set. For a given carrier frequency in a CDMA sector, for example, a length of 64 bits supports 64 mutually orthogonal Walsh codes, and correspondingly 64 CDMA channels; a length of 128 bits supports 128 mutually orthogonal Walsh codes, and correspondingly 64 CDMA channels. Under CDMA2000 1X, for example, the Walsh code bit lengths are specified as part of a Radio Configuration. More specifically, 64-bit Walsh codes are specified as part of RC3, and 128-bit Walsh codes are specified as part of RC4. A communication session, such as a voice call, that is set up with (i.e., assigned) a 64-bit Walsh code is referred to as an RC3 session or RC3 call. Accordingly, a given sector can support up to 64 concurrent RC3 channels on a given carrier frequency, and correspondingly accommodate up to 64 concurrent RC3 calls on the given carrier frequency. Similarly, a communication session, such as a voice call, that is set up with (i.e., assigned) a 128-bit Walsh code is referred to as an RC4 session or RC4 call. A given sector can support up to 128 concurrent RC4 channels on a given carrier frequency, and correspondingly accommodate up to 128 concurrent RC4 calls on the given carrier frequency. In practice, a certain number of channels are reserved by the system, so the maximum number of RC3 or RC4 calls carried may be fewer 63 or 128, respectively.

The total amount of forward-link transmission power utilized in a sector can depend, at least in part, on the number of channels concurrently transmitted in the sector. The larger the number of concurrent transmissions, the larger the total forward-link power utilization, and vice versa. Correspondingly, a larger the number of concurrent transmissions can result in a higher level of interference, and vice versa. Consequently, a sector that supports RC4 calls may, on average, utilize a larger portion of its forward-link power budget and have more RF interference than a sector that supports only RC3 calls. However, a sector that supports only RC3 calls may, on average, run out of available channels more often than does a sector that supports RC4 calls.

In some wireless communication systems, a tradeoff between the desirability of supporting more than the maximum number of RC3 calls and the benefits of not over-utilizing the forward-link power budget can be achieved by supporting both RC3 and RC4 calls, but with number threshold for each type. In particular, RC4 Walsh codes may be used to support additional calls beyond the maximum number of RC3 calls, while the forward-link power budget can also be managed by keeping the total number below a limit.

More specifically, a base station (or a BTS, for example) may allocate RC3 Walsh codes for all new calls up to a threshold number. For example, the threshold could be defined as a fraction of the maximum number of RC3 calls supported in the sector (where the maximum number is 64, minus some number of channels typically reserved by the system). An example number threshold could be 0.8, or 80%. Other threshold values could be used. Once the threshold is reached, new calls could be assigned RC4 Walsh codes, up to a maximum total number of concurrent calls. If the number of RC3 calls drops below the threshold, the BTS could again begin to assign RC3 Walsh codes for new calls.

Since different calls may have different durations, there could be a mix of RC3 and RC4 calls over time. At any given time, the number of RC3 calls is referred to herein as $N_{RC3}$, and the number of RC4 calls at any given time is referred to herein as $N_{RC4}$. The total number of calls at any given time is therefore $N_{total}=N_{RC3}+N_{RC4}$. The numbers $N_{RC3}$ and $N_{RC4}$ may also be considered as giving the distribution of RC3 and RC4 calls among access terminals in the sector.

As RC3 and RC4 calls come and go over time, the relative sizes of $N_{RC3}$ and $N_{RC4}$ may fluctuate. Correspondingly, the amount of forward-link power available from a sector's forward-link power budget will also tend to fluctuate with the relative sizes of $N_{RC3}$ and $N_{RC4}$. The current state of a sector's forward-link power budget can thus be characterized by a ratio of $N_{RC3}$ to $N_{RC4}$. More particularly, the condition $N_{RC3}/N_{RC4}<1$ may indicate a large number of current calls, and consequently high forward-link power usage. The condition $N_{RC3}/N_{RC4}>1$ may indicate the opposite, and as $N_{RC3}/N_{RC4}$ increases in this case, the amount of forward-link power available may also increase. Accordingly, the distribution of RC3 and RC4 calls, as reflected $N_{RC3}/N_{RC4}$ for example, may be used to monitor the current state of a sector's forward-link power budget.

b. Codec Assignment

When a new voice call is set up, a voice encoder and encoding rate may be selected by the base station (or other RAN element) for each of the forward link and the reverse link. Higher encoding rates may provide higher quality but also transmit at higher power, while lower encoding rates may provide lower quality, but also transmit at lower power. Since forward and reverse link transmissions can contribute to RF interference in a sector (and possibly neighboring sectors), RF interference in a sector will tend to increase with the number of access terminals engaging in communications (e.g., capacity loading), and with the respective transmission power levels on their respective forward and reverse links. Accordingly, selection of the voice encoder may be based, at least in part, on RF conditions and/or capacity loading conditions in the cell or sector (or other form of wireless coverage zone) in which the access terminal is operating when the voice call is set up.

More particularly, under CDMA2000 1X, codec support may be specified according to the EVRC-B standard for voice codecs. As described above EVRC-B defines eight different encoding rates, each identified according to different COP parameter value. Table 1 lists the COP parameters values (first column) and corresponding channel encoding rates (second column), source encoding rates (third column), and average data rates (fourth column). The average data rates include bits for silence intervals.

TABLE 1

| COP | Channel Rate (kbps) | Source Rate (kbps) | Average Rate (kbps) |
|---|---|---|---|
| 0 | 9.3 | 8.3 | 6.93 |
| 1 | 8.5 | 7.57 | 6.42 |
| 2 | 7.5 | 6.64 | 5.52 |
| 3 | 7.0 | 6.18 | 5.24 |
| 4 | 6.6 | 5.82 | 4.82 |
| 5 | 6.2 | 5.45 | 4.62 |
| 6 | 5.8 | 5.08 | 4.45 |
| 7 | 4.8 | 4.0 | 3.75 |

As can be seen, lower COP values correspond to higher data rates, and vice versa. Generally, COPs 0-3 specify encoding rates that yield the highest voice quality, but requires the highest transmission powers. COP 4 specifies encoding rate that yield voice quality comparable to EVRC, but requires slightly lower transmission power than EVRC, while COPs 5-7 specify encoding rates that yield the lower voice quality than EVRC, but requires even lower transmission powers. Under EVRC-B, the base station may select one of the COP values when a voice call is set up, and instruct the access terminal to use that value on its forward and reverse links. The access terminal may then use the corresponding encoding rate on its forward and reverse links.

Capacity loading in a cell or sector may be measured in various ways. These could include forward-link transmission power utilization, backhaul utilization, number of active call sessions, reverse noise threshold, and reverse signal strength indication. Other forms of loading condition could be used as well.

In practice, capacity loading may be taken into account in COP selection by setting one or more capacity loading thresholds. A base station (or other RAN device) can compare the current capacity loading in a sector against the one or more thresholds, and then select a COP value based on the outcome of the comparison. For example, expressing capacity loading as a utilization fraction from zero to one, three contiguous ranges could be defined with two threshold fractions between zero and one. A single threshold fraction could define two contiguous ranges, three thresholds could define four contiguous ranges, and so on.

In conventional operation, three contiguous ranges are used, and the threshold fractions separating the ranges are fixed and static. Typical values of the thresholds are 0.4 (40%) and 0.8 (80%), although other fixed values are possible. The three ranges are thus zero to 0.4; 0.4 to 0.8; and 0.8 to one. Each of the three ranges has one or more COP values associated with it, and a BTS may select a COP value for a new call by determining which range the current capacity loading fall into when a new call setup is requested. Typical COP values associated with the respective ranges are COP 2 for loading below 0.4; COP 4 for loading between 0.4 and 0.8; and COP 6 for loading above 0.8. Note that COP 0, 1, 3, 5, and 7 may not necessarily be used in this conventional scheme.

While COP selection according to conventional ranges of capacity loading may help balance capacity utilization associated with encoding with available loading capacity, it does not account for transmission power utilization associated with the relative numbers of RC3 and RC4 calls. Accordingly, it would be desirable to account for the distribution of RC3 and RC4 calls in a sector when determining a COP value for a new call.

c. Example Embodiment of Coordination

In accordance with example embodiments, selection of a codecs and coding rates for new communication sessions in a cell or sector (or other form of wireless coverage zone) could be coordinated with the radio configuration in the cell or sector by determining codecs and coding rates as a function of the relative number of active communications sessions having different types of cover codes. More specifically, a number distribution of types of cover codes currently being used could be used in a function to determine a codec and coding rate to assign to a new communication session.

In a wireless communication system operating according to CDMA2000 1X, for example, three contiguous ranges of fractional capacity loading with dynamically adjustable thresholds could be used to determine a COP value. The dynamic adjustable thresholds could be set according a ratio $N_{RC3}/N_{RC4}$ of RC3 and RC4 calls. In accordance with example embodiments, the three contiguous ranges and the dynamic adjustable thresholds separating them could be implemented as data tables store in the memory of a base station (or other RAN device). Different forms of memory are possible, including magnetic disk, solid state, and flash, among other possibilities.

Figure 4:
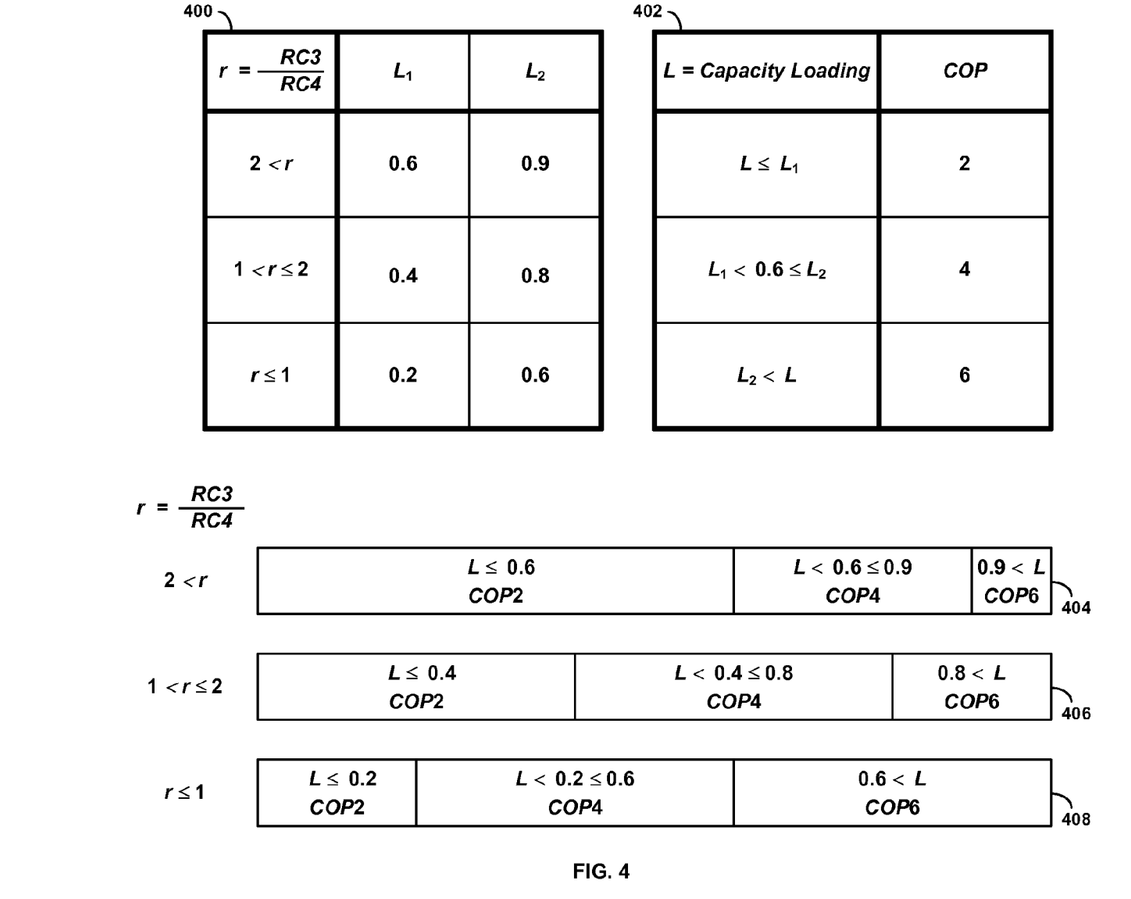
FIG. 4 illustrates an example parameter table that could be used in an implementation of an example method of coordinating codec assignment and radio configuration in wireless communication sessions, in accordance with example embodiments.

FIG. 4 illustrates an example parameter table that could be used in an implementation of an example method of coordinating codec assignment and radio configuration in wireless communication sessions, in accordance with example embodiments. The top part of the figure shows a table 400 of pairs of threshold values as a function of three ranges of the ratio $r=N_{RC3}/N_{RC4}$. Also shown is a table 402 of COP value associations with the three fractional capacity ranges defined by the pairs of threshold values in table 400.

In table 400, the first column lists three ranges of r; the second column lists three corresponding values of a lower threshold $L_1$; and the third column lists three corresponding values of an upper threshold $L_2$. Specifically, for $r>2$, $L_1=0.6$ and $L_2=0.9$; for $1<r\leq2$, $L_1=0.4$ and $L_2=0.8$; and for $r\leq1$, $L_1=0.2$ and $L_2=0.6$.

As can be seen from table 402, when fractional capacity loading L is less than $L_1$, COP 2 is selected. When fractional capacity loading L is between $L_1$ and $L_2$, COP 4 is selected. And when fractional capacity loading L is greater than $L_2$, COP 6 is selected.

The effect adjusting $L_1$ and $L_2$ according to r is that for r at the higher end (i.e., $r>2$), a higher coding rate (lower COP) is permitted or tolerated up to a higher fractional capacity loading in a sector. This is because a higher value of r is indicative of more RC3 calls, and hence lower average forward-link power utilization. Thus there may tend to be more available forward-link power in this circumstance, so the higher coding rate can be accommodated. Similarly, the lower coding rates (higher COP values) in this case also shift toward the higher end of fractional capacity loading.

For r at the lower end (i.e., $r\leq1$), the higher coding rate (e.g., COP2) is cut off at a lower value of $L_1$. This is because a lower value of r is indicative of more RC4 calls, and hence higher average forward-link power utilization. Thus there may tend to be less available forward-link power in this circumstance, so the lower cutoff may be appropriate. Similarly, the lower coding rates (e.g., COP 4 and COP 6) in this case also shift toward the lower end of fractional capacity loading.

For r in the mid-range end (i.e., $1<r\leq2$), the higher coding rate (e.g., COP2) is cut off at a more modest lower value of $L_1$ than for large r. This is because a mid-range value of r is indicative of only slightly more RC4 calls than RC3 calls, and hence moderate average forward-link power utilization. Thus there may tend to be moderate available forward-link power in this circumstance, so the moderate cutoff may be appropriate. Similarly, the lower coding rates (e.g., COP 4 and COP 6) in this case also shift to moderate fractional capacity loading.

The lower portion of FIG. 4 shows the three contiguous ranges of fractional capacity loading in more graphical form. A first range set 404 corresponds to $r>2$, for which $L_1=0.6$ and $L_2=0.9$. As shown, COP 2 is assigned for the first range, COP 4 for the second, and COP 6 for the third.

A second range set 406 corresponds to $1<r\leq2$, for which $L_1=0.4$ and $L_2=0.8$. Again, COP 2 is assigned for the first range, COP 4 for the second, and COP 6 for the third. A third range set 408 corresponds to $r\leq1$, for which $L_1=0.2$ and $L_2=0.6$. Once more, COP 2 is assigned for the first range, COP 4 for the second, and COP 6 for the third.

By adjusting the thresholds $L_1$ and $L_2$ according to $r=N_{RC3}/N_{RC4}$, and thereby adjusting the ranges of fractional capacity loading, the base station can account for radio configuration when determining a COP value to assign to new calls. Accordingly, selection of codecs and coding rates may be coordinated with radio configuration in a cell or sector.

d. Example RAN Device

Figure 5:
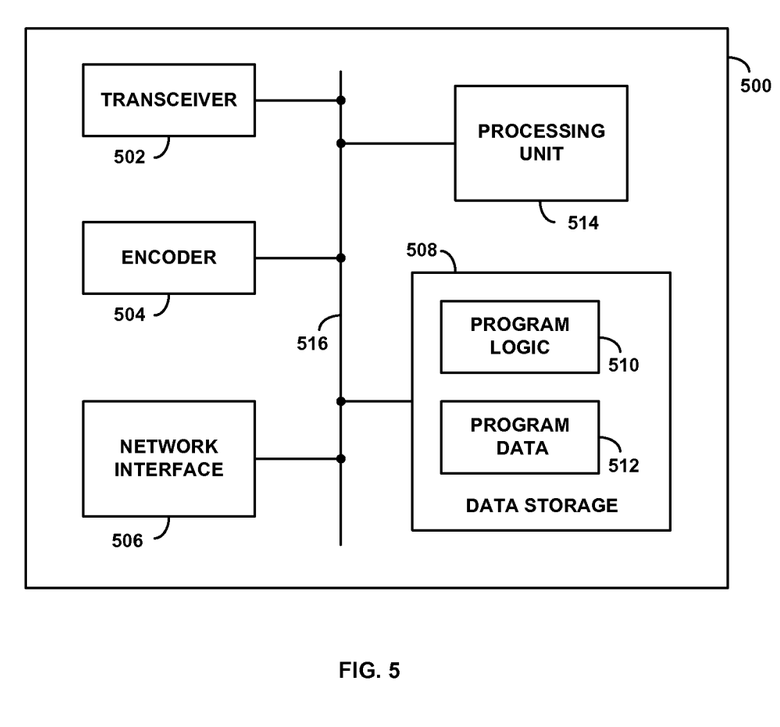
FIG. 5 is a block diagram of an example RAN device in which an example method of coordinating codec assignment and radio configuration in wireless communication sessions could be implemented.

The example embodiments of coordinating codec assignment and radio configuration in wireless communication sessions described above can be implemented as methods in a RAN device, such as a BSC, RNC, base station, or MSC, for example. FIG. 5 is a block diagram depicting functional components of an example RAN device in which example methods of coordinating codec assignment and radio configuration in wireless communication sessions could be implemented. As shown in FIG. 5, the RAN device 500, representative of BSC 206-1 or 206-2, or BSC 206-1 integrated with BTS 204-1 or BSC 206-2 integrated with BTS 204-2, in FIG. 2, for instance, includes a transceiver 502, a encoder 504, network interface 506, a processing unit 514, and data storage 508, all of which may be coupled together by a system bus 516 or other mechanism. In addition, the RAN device may also include external storage, such as magnetic or optical disk storage, although this is not shown in FIG. 5.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein.

Network interface 506 enables communication on a network, such network 200. As such, network interface 506 may take the form of trunk or optical link that can be coupled with one or more other a TDM switches (e.g., other MSCs or trunk switches) such as MSC 208-1 or 208-2. The network interface 506 could also take the form of an Ethernet network interface card or other physical connection, among other possibilities, for connection to a packet device, such as PCF 214, for instance. Further, network interface 506 in combination with encoder 504 and transceiver 502, which may include one or more BTS antennas, enables air interface communication with one or more access terminals on air-interface forward and reverse links, thereby supporting methods of coordinating codec assignment and radio configuration in wireless communication sessions described herein.

Processing unit 514 comprises one or more general-purpose processors (e.g., INTEL microprocessors) and/or one or more special-purpose processors (e.g., dedicated digital signal processor, application specific integrated circuit, etc.). In turn, the data storage 508 comprises one or more volatile and/or non-volatile storage components, such as magnetic or optical memory or disk storage. Data storage 508 can be integrated in whole or in part with processing unit 514, as cache memory or registers for instance. As further shown, data storage 508 is equipped to hold program logic 510 and program data 512.

Program logic 510 may comprise machine language instructions that define routines executable by processing unit 514 to carry out various functions described herein. In particular the program logic, communication interface, and encoder may operate cooperatively to carry out logical operation such as that discussed above. Further, program data 512 may be arranged to store data used in conjunction with the logical operations described above. Such data could include tables 400 and 402, illustrated in FIG. 4, for example.

It will be appreciated that there can be numerous specific implementations of a base station, such as RAN device 500, in which a method of coordinating codec assignment and radio configuration in wireless communication sessions could be implemented. Further, one of skill in the art would understand how to devise and build such an implementation. As such, RAN device 500 is representative of means for carrying out coordinating codec assignment and radio configuration in wireless communication sessions, in accordance with the functions and steps described herein by way of example.

4. Conclusion

An exemplary embodiment of the present invention has been described above. Those skilled in the art will understand, however, that changes and modifications may be made to this embodiment without departing from the true scope and spirit of the invention, which is defined by the claims.

What is claimed:

1. In a radio access network (RAN) device of a wireless communication system, a method comprising:
    transmitting respective wireless signals on a respective air-interface forward link from a base station of the RAN device to each of a given number of access terminals operating in a wireless coverage zone of the base station, wherein communications on each respective air-interface forward link are encoded with a respective cover code that is one of a plurality of types of cover codes, each of the plurality of types of cover codes having a different cover-code bit length;
    in response to receiving a request to set up a new communication session with a particular access terminal, allocating a new cover code for encoding communications on a new air-interface forward link in the wireless coverage zone from the base station to the particular access terminal, wherein the allocated new cover code is of a type selected from the plurality, based on a distribution among the given number of access terminals of the types of cover codes;
    updating the distribution based on allocating the new cover code; and
    determining a coding rate for communications on the new air-interface forward link based on both the updated distribution and capacity loading in the wireless coverage zone when the request was received,
    wherein determining the coding rate for communications on the new air-interface forward link based on both the updated distribution and the capacity loading in the wireless coverage zone comprises:
    adjusting one or more capacity loading thresholds based on the updated distribution; and
    comparing the capacity loading in the wireless coverage zone with at least one of the one or more adjusted capacity loading thresholds.

2. The method of claim 1, wherein receiving the request to set up a new communication session comprises receiving a request to set up a new voice call,
    and wherein determining the coding rate comprises selecting a voice codec and an encoding rate for the new voice call.

3. The method of claim 1, wherein the plurality of types of cover codes consists of a first type and a different, second type of cover code, each of the two different types having a different one of two different cover-code bit lengths,
    wherein the distribution among the given number of access terminals of the types of cover codes corresponds to a first number of the first type of cover code and a second number of the second type of cover code, the sum of the first number and the second number being the given number,
    wherein updating the distribution based on allocating the new cover code comprises incrementing one or the other, but not both, of the first number and the second number based on the selected type of the allocated new cover code,
    and wherein adjusting the one or more capacity loading thresholds based on the updated distribution comprises:
    adjusting one or more capacity loading thresholds based on a ratio of the first number to the second number taken after updating the distribution.

4. The method of claim 1, wherein the wireless communication system is configured to operate according to a CDMA family of protocols including at least EVRC-B,
    wherein the wireless coverage zone is a wireless sector,
    wherein each respective cover code is a Walsh code,
    wherein the plurality of types of cover codes includes of a first type defined according to Radio configuration 3 (RC3) and having a bit length specified by RC3, and a second type defined according to Radio configuration 4 (RC4) and having a bit length specified by RC4,
    wherein receiving the request to set up a new communication session comprises receiving a request to set up a new voice call,
    wherein the selected type of the allocated new cover code is one or the other of a RC3 Walsh code and a RC4 Walsh code,
    wherein the updated distribution corresponds to a first number of RC3 voice calls and a second number of RC4 voice calls, the sum of the first number and the second number being the given number plus one,
    wherein adjusting the one or more capacity loading thresholds based on the updated distribution comprises:
    adjusting one or more threshold boundaries separating two or more contiguous ranges of capacity loading values based on a ratio of the first number to the second number;
    mapping a current capacity loading in the wireless sector to a particular range of the two or more contiguous ranges,
    and wherein comparing the capacity loading in the wireless coverage zone with the at least one of the one or more adjusted capacity loading thresholds comprises:
    selecting a predefined EVRC-B Capacity Operating Point (COP) value based on the particular range.

5. The method of claim 4, wherein the two or more contiguous ranges of capacity loading values correspond to three contiguous ranges of fractional capacity loading within a total fractional range of fractional capacity loading from a minimum fraction of no less than zero to a maximum fraction of no greater than one,
    wherein adjusting the one or more threshold boundaries separating the two or more contiguous ranges of capacity loading values based on the ratio of the first number to the second number comprises dynamically adjusting two threshold fraction boundaries separating the three contiguous ranges of fractional capacity loading values based on mapping the ratio to one of three contiguous ranges of ratio values,
    and wherein mapping the current capacity loading in the wireless sector to the particular range comprises:
    determining the current capacity as a fraction of a maximum available capacity; and
    mapping the determined fraction to one of the three contiguous ranges of fractional capacity loading values.

6. The method of claim 4, wherein the current capacity loading in the wireless sector is a capacity loading condition in the wireless sector determined when the request was received, and wherein the capacity loading condition is of a condition type selected from the group consisting of forward-link transmission power utilization, backhaul utilization, number of active call sessions, reverse noise threshold, and reverse signal strength indication.

7. A radio access network (RAN) device of a wireless communication system comprising:
one or more processors;
memory accessible by the one or more processors; and
computer-readable instructions stored in the memory that upon execution by the one or more processors cause the RAN device to carry out functions including:
transmitting respective wireless signals on a respective air-interface forward link from a base station of the RAN device to each of a given number of access terminals operating in a wireless coverage zone of the base station, wherein communications on each respective air-interface forward link are encoded with a respective cover code that is one of a plurality of types of cover codes, each of the plurality of types of cover codes having a different cover-code bit length,
in response to receiving a request to set up a new communication session with a particular access terminal, allocating a new cover code for encoding communications on a new air-interface forward link in the wireless coverage zone from the base station to the particular access terminal, wherein the allocated new cover code is of a type selected from the plurality, based on a distribution among the given number of access terminals of the types of cover codes,
updating the distribution based on allocating the new cover code, and
determining a coding rate for communications on the new air-interface forward link based on both the updated distribution and capacity loading in the wireless coverage zone when the request was received,
wherein determining the coding rate for communications on the new air-interface forward link based on both the updated distribution and the capacity loading in the wireless coverage zone comprises:
adjusting one or more capacity loading thresholds based on the updated distribution; and
comparing the capacity loading in the wireless coverage zone with at least one of the one or more adjusted capacity loading thresholds.

8. The RAN device of claim 7, wherein receiving the request to set up a new communication session comprises receiving a request to set up a new voice call,
and wherein determining the coding rate comprises selecting a voice codec and an encoding rate for the new voice call.

9. The RAN device of claim 7, wherein the wireless communication system is configured to operate according to a CDMA family of protocols including at least EVRC-B,
wherein the wireless coverage zone is a wireless sector,
wherein each respective cover code is a Walsh code,
wherein the plurality of types of cover codes includes of a first type defined according to Radio configuration 3 (RC3) and having a bit length specified by RC3, and a second type defined according to Radio configuration 4 (RC4) and having a bit length specified by RC4,
wherein receiving the request to set up a new communication session comprises receiving a request to set up a new voice call,
wherein the selected type of the allocated new cover code is one or the other of a RC3 Walsh code and a RC4 Walsh code,
wherein the updated distribution corresponds to a first number of RC3 voice calls and a second number of RC4 voice calls, the sum of the first number and the second number being the given number plus one,
wherein adjusting the one or more capacity loading thresholds based on the updated distribution comprises:
adjusting one or more threshold boundaries separating two or more contiguous ranges of capacity loading values based on a ratio of the first number to the second number;
mapping a current capacity loading in the wireless sector to a particular range of the two or more contiguous ranges,
and wherein comparing the capacity loading in the wireless coverage zone with the at least one of the one or more adjusted capacity loading thresholds comprises:
selecting a predefined EVRC-B Capacity Operating Point (COP) value based on the particular range.

10. The RAN device of claim 9, wherein the two or more contiguous ranges of capacity loading values correspond to three contiguous ranges of fractional capacity loading within a total fractional range of fractional capacity loading from a minimum fraction of no less than zero to a maximum fraction of no greater than one,
wherein adjusting the one or more threshold boundaries separating the two or more contiguous ranges of capacity loading values based on the ratio of the first number to the second number comprises dynamically adjusting two threshold fraction boundaries separating the three contiguous ranges of fractional capacity loading values based on mapping the ratio to one of three contiguous ranges of ratio values,
and wherein mapping the current capacity loading in the wireless sector to the particular range comprises:
determining the current capacity as a fraction of a maximum available capacity; and
mapping the determined fraction to one of the three contiguous ranges of fractional capacity loading values.

11. The RAN device of claim 9, wherein the current capacity loading in the wireless sector is a capacity loading condition in the wireless sector determined when the request was received,
and wherein the capacity loading condition is of a condition type selected from the group consisting of forward-link transmission power utilization, backhaul utilization, number of active call sessions, reverse noise threshold, and reverse signal strength indication.

12. A non-transient computer-readable medium having instructions stored thereon that, upon execution by one or more processors of a radio access network (RAN) device of a wireless communication network, cause the RAN device to carry out functions including:
transmitting respective wireless signals on a respective air-interface forward link from a base station of the RAN device to each of a given number of access terminals operating in a wireless coverage zone of the base station, wherein communications on each respective air-interface forward link are encoded with a respective cover code that is one of a plurality of types of cover codes, each of the plurality of types of cover codes having a different cover-code bit length;
in response to receiving a request to set up a new communication session with a particular access terminal, allocating a new cover code for encoding communications on a new air-interface forward link in the wireless coverage zone from the base station to the particular access terminal, wherein the allocated new cover code is of a type selected from the plurality, based on a distribution among the given number of access terminals of the types of cover codes;

updating the distribution based on allocating the new cover code; and determining a coding rate for communications on the new air-interface forward link based on both the updated distribution and capacity loading in the wireless coverage zone when the request was received, wherein determining the coding rate for communications on the new air-interface forward link based on both the updated distribution and the capacity loading in the wireless coverage zone comprises:

adjusting one or more capacity loading thresholds based on the updated distribution; and comparing the capacity loading in the wireless coverage zone with at least one of the one or more adjusted capacity loading thresholds.

13. The non-transient computer-readable medium of claim 12, wherein receiving the request to set up a new communication session comprises receiving a request to set up a new voice call, and wherein determining the coding rate further comprises selecting a voice codec and an encoding rate for the new voice call.

14. The non-transient computer-readable medium of claim 12, wherein the plurality of types of cover codes consists of a first type and a different, second type of cover code, each of the two different types having a different one of two different cover-code bit lengths, wherein the distribution among the given number of access terminals of the types of cover codes corresponds to a first number of the first type of cover code and a second number of the second type of cover code, the sum of the first number and the second number being the given number, wherein updating the distribution based on allocating the new cover code comprises incrementing one or the other, but not both, of the first number and the second number based on the selected type of the allocated new cover code, and wherein adjusting the one or more capacity loading thresholds based on the updated distribution comprises:

adjusting one or more capacity loading thresholds based on a ratio of the first number to the second number taken after updating the distribution.

15. The non-transient computer-readable medium of claim 12, wherein the wireless communication system is configured to operate according to a CDMA family of protocols including at least EVRC-B, wherein the wireless coverage zone is a wireless sector, wherein each respective cover code is a Walsh code, wherein the plurality of types of cover codes includes of a first type defined according to Radio configuration 3 (RC3) and having a bit length specified by RC3, and a second type defined according to Radio configuration 4 (RC4) and having a bit length specified by RC4, wherein receiving the request to set up a new communication session comprises receiving a request to set up a new voice call, wherein the selected type of the allocated new cover code is one or the other of a RC3 Walsh code and a RC4 Walsh code, wherein the updated distribution corresponds to a first number of RC3 voice calls and a second number of RC4 voice calls, the sum of the first number and the second number being the given number plus one, wherein adjusting the one or more capacity loading thresholds based on the updated distribution comprises:

adjusting one or more threshold boundaries separating two or more contiguous ranges of capacity loading values based on a ratio of the first number to the second number;

mapping a current capacity loading in the wireless sector to a particular range of the two or more contiguous ranges, and wherein comparing the capacity loading in the wireless coverage zone with the at least one of the one or more adjusted capacity loading thresholds comprises:

selecting a predefined EVRC-B Capacity Operating Point (COP) value based on the particular range.

16. The non-transient computer-readable medium of claim 15, wherein the two or more contiguous ranges of capacity loading values correspond to three contiguous ranges of fractional capacity loading within a total fractional range of fractional capacity loading from a minimum fraction of no less than zero to a maximum fraction of no greater than one, wherein adjusting the one or more threshold boundaries separating the two or more contiguous ranges of capacity loading values based on the ratio of the first number to the second number comprises dynamically adjusting two threshold fraction boundaries separating the three contiguous ranges of fractional capacity loading values based on mapping the ratio to one of three contiguous ranges of ratio values, and wherein mapping the current capacity loading in the wireless sector to the particular range comprises:

determining the current capacity as a fraction of a maximum available capacity; and mapping the determined fraction to one of the three contiguous ranges of fractional capacity loading values.

17. The non-transient computer-readable medium of claim 15, wherein the current capacity loading in the wireless sector is a capacity loading condition in the wireless sector determined when the request was received, and wherein the capacity loading condition is of a condition type selected from the group consisting of forward-link transmission power utilization, backhaul utilization, number of active call sessions, reverse noise threshold, and reverse signal strength indication.

* * * * *